3,225,059
CERTAIN THIAZOLO [3,2-a]BENZIMIDAZOLES AND THEIR PRODUCTION

John J. D'Amico, Charleston, W. Va., assignor to Monsanto Company, St. Louis, Mo., a corporation of Delaware
No Drawing. Filed Sept. 3, 1963, Ser. No. 306,270
11 Claims. (Cl. 260—306.8)

This invention relates to thiazolo[3,2-a]benzimidazoles. These are novel heterocyclic compounds containing both the thiazolyl and benzimidazolyl moieties.

The compounds of the present invention may be represented by the general formula

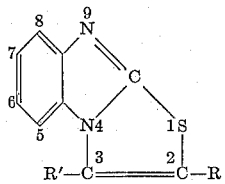

where R may be lower acyl, lower alkoxycarbonyl, carboxy, hydroxy-lower alkyl, carbaniloyl or

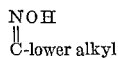

and R' may be lower alkyl or lower acyloxy. Compounds of this ring system having an olefinic linkage between the 4- and 5-positions in the thiazole ring have not heretofore been known.

The key intermediates, 3-(2-benzimidazolylthio)-2,4-pentanedione (I), ethyl 2-(2-benzimidazolylthio)acetoacetate (II) and 1-(2-benzimidazolylthio)-2-propanone (III), required for the synthesis of the new compounds were prepared by the reaction of the potassium salt of 2-mercaptobenzimidazole with 3-chloro - 2,4 - pentanedione, ethyl-α-chloroacetoacetate and chloroacetone, respectively. The preparations were effected by the following procedure:

A stirred mixture containing 150.2 grams (1.0 mole) of 2-mercaptobenzimidazole, 2000 ml. of ethyl alcohol and 66 grams (1.0 mole) of 85% potassium hydroxide was heated at 78–80° C. for 10 min. After cooling the resulting solution to 30° C., one mole of 3-chloro-2,4-pentanedione, ethyl α-chloroacetoacetate or chloroacetone was added in one portion. An exothermic reaction set in causing a temperature rise from 30 to 40° C. After stirring at 25–30° C. for 18 hours, the reaction mixture was added to 2,000 grams of ice-water and stirred for 30 minutes at 0–10° C. The precipitate was collected by filtration, washed with water until free of chloride and air-dried at 50° C. The data are summarized in Table I.

When a mixture containing I, acetic anhydride and pyridine was heated for only 10 minutes at 90–100° C., the product isolated in 96% yield was 3-(2-benzimidazolylthio)-4-hydroxy-3-penten-2-one acetate (IV). It was anticipated that acetylation would occur on the amino group but this postulation was not substantiated. The infrared spectrum revealed that the hydroxy group was acetylated. The procedure was as follows:

A stirred slurry containing 32 grams (0.129 mole) of I, 65 ml. of pyridine and 33 ml. of acetic anhydride was heated from 25 to 90° C. over a 3 minute period. The stirred solution was maintained at 90–100° C. for only 10 minutes and immedately cooled to 0° C. To this solution was added one liter cold water and stirring was continued at 0–5° C. for one hour. The resulting precipitate was collected by filtration, washed with water until neutral to litmus and air-dried at 25–30° C. The product, M.P. 130–132° C., was obtained in 96% yield. After recrystallization from ethyl alcohol it melted at 136–137° C. Analysis gave 9.64% nitrogen and 10.76% sulfur compared to 9.65% nitrogen and 11.04% sulfur calculated for $C_{14}H_{14}N_2O_3S$.

On the other hand, if a mixture containing I, acetic anhydride and pyridine was heated at 90–100° C. for 3 hours, methyl 3-methylthiazolo[3,2-a]benzimidazolyl ketone (V) was obtained in 99% yield. The product contained no ester bonds in the infrared spectrum. The following procedures produced this compound:

Method I

A stirred slurry containing 49.2 grams (0.2 mole) of I, 50 ml. of acetic anhydride and 100 ml. of pyridine was heated at 95–100° C. for 3 hours. The solution was cooled to 0° C. and held at 0–5° C. for 1 hour. The resulting precipitate was collected by filtration, washed with water until neutral to litmus and air-dried at 25–30° C. The product, M.P. 167–168° C., was obtained in 99% yield. After recrystallization from ethyl alcohol the melting point remained unchanged. Analysis gave 12.51% nitrogen and 13.70% sulfur compared to 12.17% nitrogen and 13.92% sulfur calculated for $C_{12}H_{10}N_2OS$.

Method II

A stirred solution containing 22 grams (0.076 mole) of IV, 50 ml. of pyridine and 25 ml. of acetic anhydride was heated at 95–100° C. for 3 hours. The product was isolated as described in Method I. The product, M.P. 164–166° C., was obtained in 97.5% yield. After recrystallization from ethyl alcohol it melted at 167–168° C. A mixture melting point with the product obtained from Method I was not depressed and the infrared spectra of the two were superimposable. Analysis gave 12.51% nitrogen and 13.92% sulfur compared to 12.17% nitro-

TABLE I

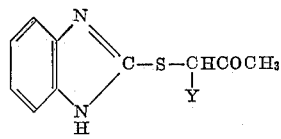

| No. | Y | Percent Yield Crude | M.P. | Empirical Formula | Percent N | | Percent S | |
|---|---|---|---|---|---|---|---|---|
| | | | | | Calcd. | Found | Calcd. | Found |
| I | —COCH₃ | 88.5 | a 185–186 | $C_{12}H_{12}N_2O_2S$ | 11.28 | 11.19 | 12.91 | 12.56 |
| II | —COOC₂H₅ | 71.8 | a 149–150 | $C_{13}H_{14}N_2O_3S$ | 10.07 | 10.38 | 11.52 | 11.26 |
| III | —H | 82.2 | a 114–115 | $C_{10}H_{10}N_2OS$ | 13.58 | 13.66 | 15.52 | 15.30 | a Recrystallized from ethyl alcohol.

gen and 13.92% sulfur calculated for $C_{12}H_{10}N_2OS$. The product was soluble in acetone as well as in hot ethanol and was slightly soluble in benzene.

When a mixture or I, acetic anhydride and pyridine was heated at 90–100° C. for one hour, IV and V were obtained in 27.4% and 69.5% yields, respectively. Separation of IV from V was accomplished by cooling the reaction mixture to 0° C. and collecting V by filtration. Upon addition of cold water to the filtrate, IV precipitated and was collected by filtration. Although V did not form upon heating IV with pyridine alone at 90–100° C. for 3 hours, it will be noted from Method II that heating pyridine, acetic anhydride and IV yielded V in 97.5% yield.

The infrared spectrum of IV was obtained as solutions in $CHCl_3$ and DMF. The compound was also soluble in hot acetone and slightly soluble in benzene. Significant absorption bands (cm.$^{-1}$) were as follows: 3350 (W) N—H bonded; 3020 (W) C—H st. (aromatic); 2970 (M) C—H st. (aliphatic); 1720 (S) C=O st. (ester); 1680 (S) C=O st. (conjugated to double bond); 1610 (S) C=C st. (conjugated to carbonyl); 1560 (S) unassigned; 1490 (S) skeletal in-plane vibration of benzimidazole ring; 1455 (S) $CH_3$ def. (asym.); 1370 (S) $CH_3$ def. (sym.) 1310 (S) unassigned; 1250 (S) C—O—C st. (ester); 760 (S) and 748 (S) out-of-plane (ortho substitution). The infrared spectrum of V was obtained as solutions in $CHCl_3$ and DMF. Significant absorption bands (cm$^{-1}$) were as follows: 3020 (W) C—H st. (aromatic); 2960 (M) C—H st. (aliphatic); 1674 (S) C=O st. (conjugated to a double bond); 1610 (M) C=C st. (conjugated to a carbonyl); 1560 (S) unassigned; 1490 (S) (skeletal in-plane vibration of benzimidazole ring); 1455 (S) —$CH_3$ def. (asym.); 1370 (S) $CH_3$ def. (sym.); 1310 (S) unassigned; 760 (S) and 748 (S) C—H out-of-plane (ortho substitution).

It was anticipated that the reaction of III with acetic anhydride and pyridine at 90–100° C. for a period of 4 hours would yield 3-methylthiazolo[3,2-a]benzimidazole (X) but instead 1-(2-benzimidazolylthio)-1-propen-2-ol acetate (VI) was obtained in 99% yield. The infrared spectrum and elemental analysis confirmed that no ring closure occurred under these conditions. Procedure for the preparation of VI was as follows:

A stirred solution containing 41.3 grams (0.2 mole) of III, 50 ml. of acetic anhydride, and 100 ml. of pyridine was heated at 90–100° C. for 4 hours. After cooling to 25° C., 1000 ml. of water was added and stirring was continued at 25–30° C. for an additional 30 minutes. The precipitate was collected by filtration, washed with water until neutral to litmus and air-dried at 25–30° C. The product, M.P. 155–158° C., was obtained in 99% yield. After recrystallization from ethyl alcohol it melted at 171–172° C. Analysis gave 11.29% nitrogen and 13.30% sulfur compared to 11.28% nitrogen and 12.91% sulfur calculated for $C_{12}H_{12}N_2O_2S$. Besides hot ethyl alcohol the product was soluble in hot acetone and hot benzene.

The treatment of II with acetic anhydride and pyridine at 90–100° C. for 10 minutes furnished ethyl 2-(2-benzimidazolylthio)-3-hydroxycrotonate acetate (VII) in 99% yield. The procedure was as follows:

A stirred solution containing 27.9 grams (0.1 mole) of II, 50 ml. of pyridine and 25 ml. of acetic anhydride was heated from 25 to 90° C. over a 3 minute period and then maintained at 90–100° C. for only 10 minutes. It was immediately cooled to 0° C. and 500 ml. of water and 600 ml. of ethyl ether were added. After stirring the mixture for 15 minutes, the ether solution was separated, washed with water until the washings were neutral to litmus and dried over sodium sulfate. The ether was removed in vacuo at a maximum temperature of 30° C. at 1–2 mm. The resulting semi-solid was air-dried on a porous plate at 25–30° C. The product, M.P. 68–71° C., was obtained in 99% yield. After recrystallization from ethyl alcohol it melted at 88–90° C. Upon standing the compound was unstable and liberated acetic acid. Analysis gave 9.15% nitrogen and 10.10% sulfur compared to 8.75% nitrogen and 10.01% sulfur calculated for $C_{15}H_{16}N_2O_4S$.

The reaction of VII or II in acetic anhydride and pyridine solution at 90–100° C. for 3 hours gave ethyl 3-methylthiazolo[3,2 - a]benzimidazole - 2 - carboxylate (VIII). The procedures were as follows:

*Method III*

A stirred solution containing 55.7 grams (0.2 mole) of II, 50 ml. of acetic anhydride and 100 ml. of pyridine was heated at 90–100° C. for 3 hours. After cooling the solution to 0° C., 1000 grams of ice-water was added and stirring was continued at 0–5° C. for 30 minutes. The precipitate was collected by filtration, washed with water until neutral to litmus and air-dried at 25–30° C. The product, M.P. 106–109° C., was obtained in 96.5% yield. After recrystallization from ethyl alcohol it melted at 122–123° C. Analysis gave 10.67% nitrogen and 12.37% sulfur compared to 10.76% nitrogen and 12.32% sulfur calculated for $C_{13}H_{12}N_2O_2S$.

*Method IV*

A stirred solution containing 15 grams (0.047 mole) of VII, 25 ml. of acetic anhydride and 50 ml. of pyridine was heated at 90–100° C. for 3 hours. After cooling the solution to 0° C., 400 grams of ice-water were added and stirring was continued at 0–5° C. for 30 minutes. The solid was collected by filtration, washed with water until neutral to litmus and air-dried at 25–30° C. The product, M.P. 115–118° C., was obtained in 98% yield. After recrystallization from ethyl alcohol it melted at 122–123° C. A mixture melting point with the product obtained from Method III was not depressed and the infrared spectra of the two were superimposable. Analysis gave 10.74% nitrogen and 12.21% sulfur compared to 10.76% nitrogen and 12.32% sulfur calculated for $C_{13}H_{12}N_2O_2S$.

The infrared spectrum of VIII was obtained as solutions in $CHCl_3$ and DMF. The compound was also soluble in acetone and benzene. Significant absorption bands (cm.$^{-1}$) were as follows: 3030 (W) C—H st. (aromatic); 2960 (M) C—H st (aliphatic); 1708 (S) C=O st. (ester carbonyl with $\alpha,\beta$-unsaturation); 1612 (M) C=C st. (conjugated to carbonyl); 1595 (S) and 1580 (M) unassigned; 1490 (VS) skeletal in-plane vibration of benzimidazole ring; 1455 (M) $CH_2$ and $CH_3$ def.; 1435 (M) unassigned; 1380 —$CH_3$ def. (sym.); 1310 (S) and 1280 (S) unassigned; 1250 (S) C—O—C st. (ester linkage); 1080 (S) unassigned; 760 (S) and 750 (S) C—H out-of-plane def. (ortho substitution).

The saponification of VIII with aqueous sodium hydroxide furnished 3-methylthiazolo[3,2-a]benzimidazole-2-carboxylic acid (IX). A solution containing 182 grams (0.7 mole) of VIII, 224 grams (1.4 mole) of 25% aqueous sodium hydroxide and 1600 ml. of ethyl alcohol was stirred at 75–80° C. for 4 hours. After cooling to 25° C., the reaction mixture was added to 4000 grams of ice-water. The stirred solution was made acidic with 220 grams (2.2 moles) of concentrated hydrochloric acid. The resulting precipitate was collected by filtration, washed with water until the washings were neutral to litmus and air-dried at 50° C. The product, M.P. 249–251° C., with decomposition, was obtained in 90.5% yield. The melting point remained unchanged upon dissolving IX in dilute sodium hydroxide and then reprecipitating from concentrated hydrochloric acid. The product was insoluble in water and common organic solvents. Analysis gave 12.25% nitrogen and 13.75% sulfur compared to 12.06% nitrogen and 13.81% sulfur calculated for $C_{11}H_8N_2O_2S$. The infrared spectra of IX were obtained as Nujol and halocarbon mulls. Significant absorption bands (cm.$^{-1}$) were as follows: 3040 (W) C—H st. (aliphatic); 2980 (W) C—H st. (aliphatic); 2353 (M) broad, O—H st. (hydrogen-bonded carboxylic acid); 1675 (M) C=O st. (as in α,β-unsaturated carboxylic acid); 1610 (M) C=C st. (conjugated to carbonyl); 1450 (S), 1315 (M) and 1226 (M) unassigned; 758 (M) and 740 (S) C—H out-of-plane (ortho substitution).

The decarboxylation of IX in a dimethylaniline solution at 190–200° C. furnished 3-methylthiazolo[3,2-a]benzimidazole (X). A stirred solution containing 38 grams (0.17 mole) of IX and 150 ml. of dimethylaniline was heated at 190–200° C. for 5 hours. After cooling the solution to 25° C., 500 ml. of water containing 125 grams (1.25 mole) of concentrated hydrochloric acid was added. A small amount of impurities were removed by filtration. To the stirred filtrate, concentrated ammonium hydroxide was added dropwise until pH 9 was obtained. To this stirred slurry, 300 ml. of ethyl ether was added and stirring continued for 15 minutes. The precipitate was collected by filtration, washed with water until the washings were neutral to litmus and air-dried at 25–30° C. The product, M.P. 162–164° C., was obtained in 45.3% yield. After recrystallization from ethyl alcohol it melted at 165–166° C. Analysis gave 14.42% nitrogen and 16.93% sulfur compared to 14.88% nitrogen and 17.03% sulfur calculated for $C_{10}H_8N_2S$. The infrared spectrum of X was obtained as solutions in $CHCl_3$ and DMF. Significant absorption bands (cm.$^{-1}$) were as follows: 3110 (W) possible C—H st. of

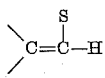

group wherein the additional strain of the fused rings imparts more S character to the C—H bond; 3040 (W) C—H (aromatic); 2950 (M) C—H aliphatic; 1616 (W) C=C st. 1490 (VS) skeletal in-plane vibration of benzimidazole ring; 1448 (S) unassigned, but some contribution from C—H def. possible; 1382 (W) $CH_3$ def. (sym.); 1308 (M), 1266 (M) and 1250 (M) unassigned; 758 (S) and 744 (S) C—H out-of-plane (ortho substitution).

The reduction of V with sodium borohydride gave α,3-dimethylthiazolo[3,2-a]benzimidazole-2-methanol (XI). To a stirred solution containing 46.1 grams (0.2 mole) of V in 500 ml. of ethyl alcohol was added dropwise at 65–70° C. a solution containing 7.6 grams (0.2 mole) of sodium borohydride in 200 ml. of ethyl alcohol over a 30 minute period. The stirred reaction mixture was heated at 75–80° C. for 2 hours. After cooling to 25° C., the reaction mixture was added to 2000 grams of ice-water and stirred at 0–10° C. for 1 hour. The solid was collected by filtration, washed with water until the washings were neutral to litmus and air-dried at 25–30° C. The product, M.P. 222–228° C., was obtained in 86.5% yield. After recrystallization from dimethylformamide it melted at 227–228° C. Analysis gave 12.06% nitrogen and 14.12% sulfur compared to 12.06% nitrogen and 13.80% sulfur calculated for $C_{12}H_{12}N_2OS$. The infrared spectrum of XI was obtained as a Nujol mull. Significant absorption bands (cm.$^{-1}$) were as follows: 3200 (M) O—H st. (bonded); 1624 (M) C=C st.; 1490 (S) skeletal vibration of benzimidazole ring; 1290 (M), 1275 (M) and 1222 (M) unassigned; 1087 (S) O—H def.; 759 (S) and 749 (S) C—H out-of-plane (ortho substitution).

2-acetyl-3-methylthiazolo[3,2-a]benzimidazole oxime (XII) was obtained in 77% yield by the reaction of V with hydroxylamine. A stirred slurry containing 46.1 grams (0.2 mole) of V and 500 ml. of ethyl alcohol was heated to 75° C. To the cooled stirred solution at 25° C. was added in one portion 16.4 grams (0.25 mole) of hydroxylamine hydrochloride in 50 ml. of water. A solution containing 17.4 grams (0.125 mole) of potassium carbonate in 60 ml. of water was added dropwise at 25–30° C. over a 15 minute period. The stirred reaction mixture was heated at 75–80° C. for 2½ hours. After cooling the reaction mixture to 5° C., the precipitate was collected by filtration, washed with water until the washings were neutral to litmus and air-dried at 25–30° C. The product, M.P. 230–234° C. with decomposition, was obtained in 77% yield. After recrystallization from ethyl alcohol it melted at 246–247° C. with decomposition. The product was also soluble in dimethylformamide and concentrated hydrochloric acid and slightly soluble in hot acetone. Analysis gave 16.95% nitrogen and 13.16% sulfur compared to 17.13% nitrogen and 13.07% sulfur calculated for $C_{12}H_{11}N_3OS$. The infrared spectrum of XII was obtained as a Nujol mull. Significant absorption bands (cm.$^{-1}$) were as follows 2800–2600 (broad) N—O—H (associated); 1600 (M) C=C st. (conjugated); 1492 (M) skeletal vibration of benzimidazole ring; 1428 (S), 1400 (S), 1266 (S) unassigned; 751 (S) and 742 (S) C—H out-of-plane def. (ortho substitution).

The treatment of IX with phosphorus trichloride and aniline furnished 3-methylthiazolo[3,2-a]benzimidazole-2-carboxanilide (XIII). To a stirred slurry containing 34.9 grams (0.15 mole) of IX, 14.1 grams (0.15 mole) of aniline and 200 ml. of chlorobenzene, 6.9 grams (0.05 mole) of phosphorus trichloride was added dropwise at 80–90° C. over a 5 minute period. The stirred reaction mixture was heated at 120–130° C. for 6 hours. After cooling the reaction mixture to 25° C., 500 ml. of water containing 40 grams (0.25 mole) of 25% aqueous sodium hydroxide was added and stirring was continued for 1 hour. The precipitate was collected by filtration, washed with water until the wash water was neutral to litmus and air-dried at 25–30° C. The product, M.P. 232–233° C. with decomposition, was obtained in 64.2% yield. The melting point remained unchanged after recrystallization from dimethylformamide. XIII was slightly soluble in hot acetone, hot benzene and hot ethanol. Analysis gave 13.40% nitrogen compared to 13.67% calculated for $C_{17}H_{13}N_3OS$. The infrared spectrum of XIII was obtained as saturated solutions in $CHCl_3$ and DMF. Significant absorption bands (cm.$^{-1}$) were as follows: 3300 broad (W), N—H (as in secondary amide); 3030 (W) C—H st. (aromatic); 2960 (W) C—H st. (aliphatic); 1670 (M) carbonyl (amide I); 1610 (W) C=C st. (conjugated to carbonyl); 1600 (M) and 1580 (W) unassigned; 1490 (S) skeletal vibration of benzimidazole ring; 1455 (W) —$CH_3$ def. (asym.); 1440 (S) and 1313 (M) unassigned; 1377 (W) —$CH_3$ def. (sym.); 760 (S) and 747 (M) C—H out-of-plane def. (ortho and mono substitution); 694 (M) C—H out-of-plane (mono substitution).

The new compounds accelerated the vulcanization of rubber. Although some of the intermediates possessed this property, as for Example IV, the accelerating activity was enhanced by closure of the ring. As illustrative of the accelerating activity, vulcanizable stocks were compounded comprising:

| | Parts by weight |
|---|---|
| Smoked sheets | 100. |
| Carbon black (high abrasion furnace) | 50. |
| Zinc oxide | 3. |
| Stearic acid | 2. |
| Hydrocarbon softener | 3. |
| Accelerator | 0.5 |

The modulus and tensile properties after heating in a press for 60 minutes at 144° C. were as follows:

| Accelerator | Modulus of Elasticity in lbs./in.² at 300% Elongation | Ultimate Tensile in lbs./in.² | Ultimate Elongation, Percent |
|---|---|---|---|
| V | 1,270 | 2,100 | 460 |
| VIII | 1,110 | 2,110 | 400 |

As further examples of the accelerating activity, vulcanizable stocks were compounded comprising:

| | Parts by weight |
|---|---|
| Smoked sheets | 100. |
| Carbon black (high abrasion furnace) | 50. |
| Zinc oxide | 5. |
| Stearic acid | 3. |
| Hydrocarbon softener | 3. |
| Accelerator | 0.5 |

The modulus and tensile properties obtained after curing in a press for 60 minutes at 144° C. were as follows:

| Accelerator | Modulus of Elasticity in lbs./in.² at 300% Elongation | Ultimate Tensile in lbs./in.² | Ultimate Elongation Percent |
|---|---|---|---|
| VI | 1,060 | 2,220 | 480 |
| IX | 730 | 1,280 | 450 |
| X | 1,900 | 3,300 | 470 |
| XI | 1,490 | 2,500 | 450 |
| XII | 1,320 | 2,000 | 400 |
| XIII | 980 | 2,000 | 480 |

These data demonstrate the useful accelerating properties of the new compounds. The retarding effect of the carboxyl group in IX is noticeable from the foregoing modulus and tensile figures and it was observed that the stock containing IX was resistant to prevulcanization. The scorch time was much longer than for the other stocks. Also, the stock containing X was observed to be resistant to degradation. X is a mild inhibitor of attack by oxygen and ozone.

Compound XI is a pre-emergence herbicide. Applied at a dosage of 25 lbs./acre it completely inhibited the germination and emergence of morning glory, sugar beet, foxtail, crab grass and tomato. It killed pigweed when applied to the foliage thereof at a concentration of 0.5%. The compound was formulated as an aqueous dispersion after dissolving in a small amount of organic solvent. If desired, a small amount of a surface active agent may be added to facilitate dispersion. The compounds are insoluble in water but most of them are soluble in common organic solvents. Compound XI is insoluble in water, ether, acetone, benzene, heptane and ethanol but soluble in dimethylformamide and hydrochloric acid. The compound can also be prepared as a wettable powder by addition to a wettable dust base, as for example, attapulgite clay plus a wetting agent. The mixture is ground to a uniform mix and diluted with water for application as a herbicide.

Although not effective in pre-emergence application, X is a contact herbicide. Applied to foliage in the form of an aqueous dispersion at a concentration of 0.5% it killed pigweed, radish and tomato and was severely toxic to wild buckwheat and sugar beets. The compound is insoluble in water, ether and heptane but soluble in acetone, benzene, hot ethanol and hydrochloric acid. VIII killed pigweed and tomato and was severely toxic to wild buckwheat under the same conditions and XIII killed pigweed.

It is intended to cover all changes and modifications of the examples of the invention herein chosen for purposes of disclosure which do not constitute departures from the spirit and scope of the invention.

What is claimed is:

1. A compound of the formula

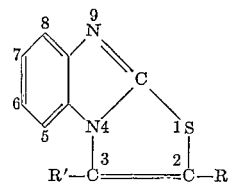

where R is selected from a group consisting of,

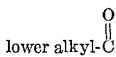

lower alkoxycarbonyl, carboxy, hydroxy-lower alkyl, carbaniloyl and

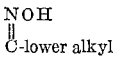

and R' is selected from a group consisting of lower alkyl and

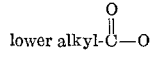

2. Ethyl 3 - methylthiazolo[3,2 - a]benzimidazole - 2-carboxylate.
3. 3 - methylthiazolo[3,2 - a]benzimidazole - 2-carboxylic acid.
4. α,3 - dimethylthiazolo[3,2 - a]benzimidazolo - 2-methanol.
5. 2 - acetyl - 3 - methylthiazolo[3,2 - a]benzimidazole oxime.
6. 3 - methylthiazolo[3,2 - a]benzimidazole - 2 - carboxanilide.
7. Methyl 3-methylthiazolo[3,2-a]benzimidazolyl ketone.
8. 1-(2-benzimidazolylthio)-1-propen-2-ol acetate.
9. 3 - (2 - benzimidazolylthio) - 4 - hydroxy - 3 - penten-2-one acetate.
10. The process which comprises heating 3-(2-benzimidazolylthio)-2,4-pentanedione with acetic anhydride and pyridine for a time sufficient to effect ring closure and isolating methyl 3-methylthiazolo[3,2-a]benzimidazolyl ketone.
11. The process which comprises heating ethyl 2-(2-benzimidazolylthio)acetoacetate with acetic anhydride for a time sufficient to effect ring closure and isolating ethyl 3-methylthiazolo[3,2-a]benzimidazole-2-carboxylate.

References Cited by the Examiner
UNITED STATES PATENTS 2,790,172   4/1957   Rudner _____ 260—306.8

OTHER REFERENCES

Andersag et al., Ber. Deut. Chem., vol. 70B, pages 2037–8 and 2044 (1937).

Todd et al., Ber Deut. Chem., vol. 69B, pages 219 and 223 (1936).

NICHOLAS S. RIZZO, *Primary Examiner*.
HENRY R. JILES, *Examiner*.
ALTON D. ROLLINS, *Assistant Examiner*.